US007436141B2

(12) United States Patent
Perez et al.

(10) Patent No.: US 7,436,141 B2
(45) Date of Patent: Oct. 14, 2008

(54) MOVABLE BARRIER OPERATOR WITH TRAVEL LIMIT ADJUSTMENT CAPABILITIES

(75) Inventors: Daniel Perez, Foothill Ranch, CA (US); Jonathan Becerra, Cypress, CA (US); Steve Taheri, Dana Point, CA (US)

(73) Assignee: Viking Access Systems, LLC., Irvine, CA (US)

( * ) Notice: Subject to any disclaimer, the term of this patent is extended or adjusted under 35 U.S.C. 154(b) by 127 days.

(21) Appl. No.: 11/588,558

(22) Filed: Oct. 26, 2006

(65) Prior Publication Data

US 2008/0100240 A1 May 1, 2008

(51) Int. Cl.
*G05B 5/00* (2006.01)

(52) U.S. Cl. ....................... 318/466; 318/467; 318/468; 318/445

(58) Field of Classification Search ................. 318/466, 318/467, 468, 445, 443, 444, 450, 453
See application file for complete search history.

(56) References Cited

U.S. PATENT DOCUMENTS

| | | | | |
|---|---|---|---|---|
| 4,338,553 | A | 7/1982 | Scott, Jr. | |
| 4,408,146 | A | 10/1983 | Beckerman | |
| 4,684,853 | A * | 8/1987 | Coash | 318/16 |
| 5,278,480 | A | 1/1994 | Murray | |
| 5,299,678 | A | 4/1994 | Chang et al. | |
| 5,869,940 | A | 2/1999 | Parsadyan | |
| 5,929,580 | A | 7/1999 | Mullet et al. | |
| 6,051,947 | A | 4/2000 | Lhotak et al. | |
| 6,078,249 | A | 6/2000 | Slavik et al. | |
| 6,326,751 | B1 | 12/2001 | Mullet et al. | |
| 6,414,454 | B1 | 7/2002 | Lhotak et al. | |
| 6,605,910 | B2 | 8/2003 | Mullet et al. | |
| 7,116,072 | B1 * | 10/2006 | Murray et al. | 318/466 |

* cited by examiner

*Primary Examiner*—Karen Masih
(74) *Attorney, Agent, or Firm*—Jafari Law Group, Inc.; David V. Jafari

(57) ABSTRACT

A method and a device capable of making fine-tune adjustments in the traveling limits of a movable barrier operator are disclosed. More particularly, an apparatus in accordance with the present invention comprises of a movable barrier operator for controlling a travel limit of a movable barrier comprises of an electrical component sending an input signal to a controller, a controller to derive an output signal from the input signal, and a motor to receive the output signal and modify the travel limit of the movable barrier. More specifically, said method and device can be used to make such fine-tune adjustments to modify an undesirable gap of a movable barrier in its fully closed or fully open positions.

26 Claims, 5 Drawing Sheets

MOVABLE BARRIER OPERATOR WITH TRAVEL LIMIT ADJUSTMENT CAPABILITIES

BACKGROUND OF THE INVENTION

1. Technical Field of the Invention

This invention relates generally to a movable barrier operator that allows travel limit adjustments of the position of a movable barrier after it has reached its normal travel limit, and more particularly, a movable barrier operator that allows for fine-tune adjustment of the travel limits of said movable barrier.

2. Description of the Related Art

Movable barriers have existed in many situations to allow access to a secured area, while at the same time prohibiting access to the same secured area to undesired trespassers. These movable barriers could vary in size, shape, or operation method, but all such movable barriers require an operator that controls the movement of a movable barrier between completely opened and completely closed position. Consequently, such movable barrier operators need a method to determine its travel limits, more specifically the completely opened and completely closed position.

Currently, one approach to movable barrier operator determines the opening and closing positions using cams attached to the shaft of the movable barrier. The cam locations on the shaft determine the completely opened position and the completely closed position of such movable barrier when they come in contact with a limit sensor telling the motor to stop.

Although such a design is simple and works great with broad ranges of movement, it is difficult to obtain fine point adjustment using the above mentioned cams and limit switch combination. Using the cams to set the travel limits may only give rough estimates of the completely open position and the completely closed position because the actual movements of the movable barrier in relation to the cam positions are significantly greater, thus minor adjustment in cam location equates to significant shift in the position of the movable barrier.

Consequently, using traditional adjustment methods often leaves undesirable gaps between the actual position of the movable barrier and the position of the movable barrier in a completely closed or open position. As a result, there is an undesirable gap created between the movable barrier and the physical stopping apparatus.

Traditionally, in order to make such a fine point adjustment eliminating the undesirable gap, a technician has to physically hold down a lever actuator, a limit switch, and the retainer plate, while moving the cam along the notches of the driving shaft. This process requires a complicated procedure that may not easily be achieved by a single technician, thus requiring more than one technician to perform such initial set up. Moreover, in order to make such an adjustment, a technician needs to disassemble the movable barrier operator in order to access the necessary components.

Current products addressing the above mentioned problem of this undesirable gap have used encoders, hall-effect devices, position detectors, learned routines, human intervention, or even trial and error with the already existing cams in the movable barrier operator. However, these methods are expensive, thus making them impractical for gate operator purposes. Moreover, such learned methods require extensive set up time and effort on the part of the installer.

It can be seen that there is a need for a movable barrier operator that is easily adjustable without involving manual adjustment of the cam limits, which may be inefficient and ineffective in small ranges of movement. Moreover, there is also a need that such an adjustment that's capable of fine-tune adjustment capabilities without involving expensive electronic circuitry such as encoders and hall-effect devices. Consequently, there is a need for a movable barrier operator that allows for adjustment of the gap of the movable barrier in the completely closed or open position of the movable barrier without extensive adjustment by a technician.

SUMMARY OF THE INVENTION

To minimize the limitations in the prior art, and to minimize other limitations that will become apparent upon reading and understanding the present specifications, the present invention discloses a method and a device capable of making fine-tune adjustments in the traveling limits of a movable barrier operator.

An apparatus in accordance with the present invention comprises of a movable barrier operator for controlling a travel limit of a movable barrier comprises of an electrical component sending an input signal to a controller, a controller to derive an output signal from the input signal, and a motor to receive the output signal and modify the travel limit of the movable barrier.

Additionally, an apparatus in accordance with the present invention comprises of a movable barrier operator for eliminating a gap of a movable barrier comprising, an electrical component configured to generate a quantized signal, a converter for converting the quantized signal into a digital input signal, a controller for deriving an output signal as a function of the digital input signal, and a motor to receive the output signal.

Moreover, the present invention also discloses a method of adjusting a gap of a movable barrier in a closed position comprising of closing the movable barrier, adjusting an electrical component configured to generate a quantized signal, converting the quantized signal to a digital input signal, applying the digital input signal to a controller configured to drive a motor, deriving an output signal as a function of the digital input signal using said controller, sending the output signal to a motor, and commanding the motor to continue movement of the movable barrier to adjust the gap.

It is an objective of the present invention to achieve such fine-tune adjustment of the travel limits of a movable barrier without expensive electronic devices that drive up the cost of such gate operators.

It is another objective of the present invention to circumvent the need to repeatedly readjust the travel limits in an inefficient manner.

It is yet another objective of the present invention to achieve accurate adjustment means of adjusting the travel limits of a movable barrier.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

DETAILED DESCRIPTION OF THE DRAWINGS

The following description addresses a number of embodiments and applications of the present invention. References made are to the accompanying drawing that explains the present invention, and in which is shown by way of illustration specific embodiments in which the invention may be practiced. It is to be understood that other embodiments may be utilized and structural changes may be made without departing from the scope of the present invention.

SPECIFICS OF THE INVENTION

Figure 1:
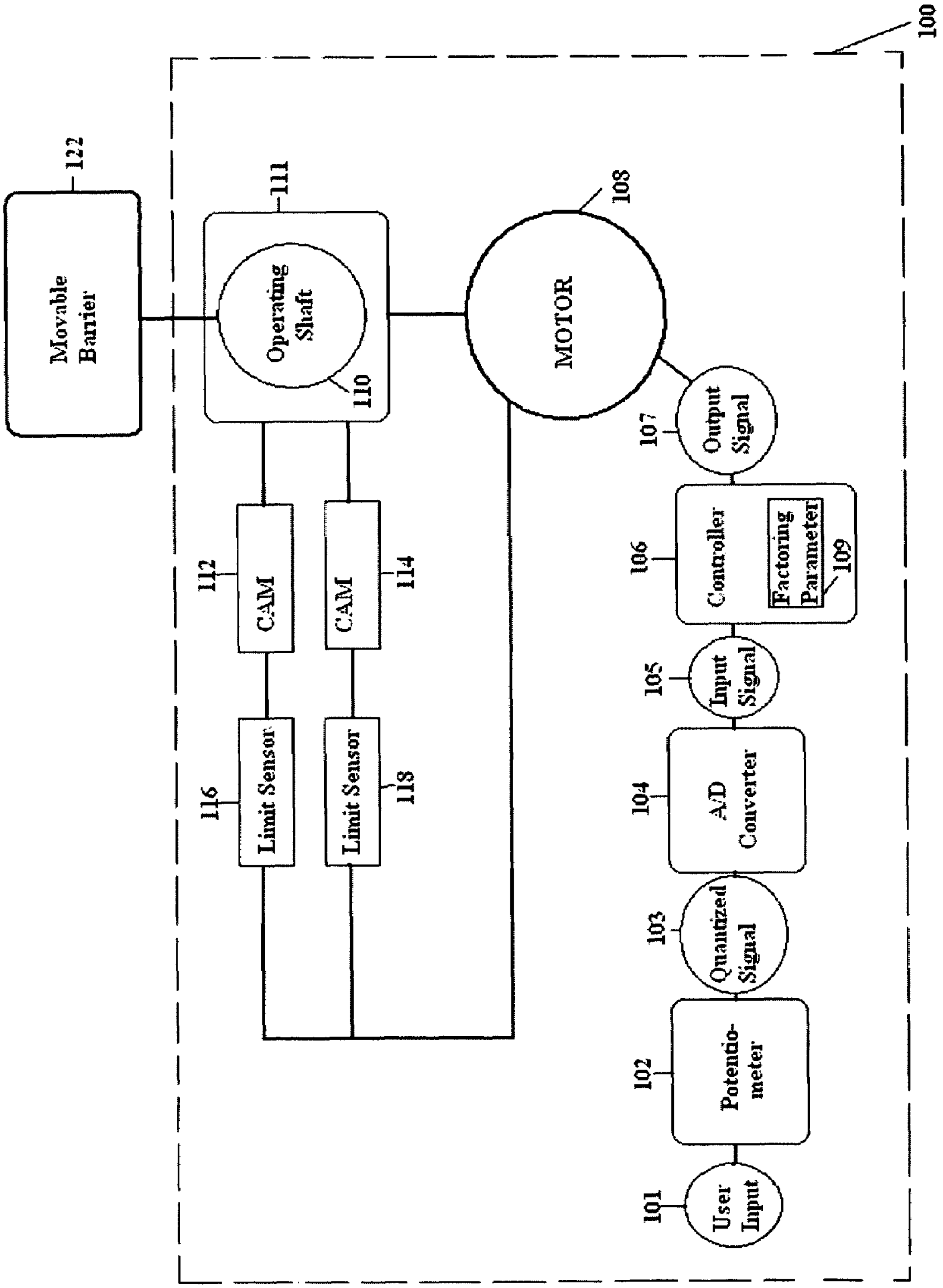
FIG. 1 illustrates a block diagram of the movable barrier operator in accordance with an embodiment of the present invention.

FIG. 1 illustrates a block diagram of the various components and operations of a movable barrier operator capable of adjusting an undesirable closing gap.

Movable barrier operator 100 includes motor 108, operating shaft 110, and movable barrier 122. Motor 108 drives operating shaft 110 using a power source (not shown), and operating shaft 110 subsequently drives the movement of movable barrier 122 utilizing gear box 111. A set of cams, cam 112 and cam 114 are coupled on the operating shaft 110, and their position shifts along with the rotational movement of operating shaft 110. Limit sensor 116 and limit sensor 118 are placed along the travel limits of operating shaft 110. When cam 112 or cam 114 come in contact with limit sensor 116 or limit sensor 118, it sends a signal back to motor 108 to tell motor 108 to cease operation of motor 108, thus preventing further movement of operating shaft 110.

In the current embodiment, movable barrier 122 is a sliding type gate. However, movable barrier 122 could be a swinging type gate, a sectional garage door, a flat unitary piece garage door, or any apparatus capable of creating an enclosure without departing from the scope of the present invention.

When operating shaft 110 ceases movement, generally, there is an undesirable closing gap closure" created between the physical location of movable barrier 122, and a completely closed position. The undesirable gap is created because when operating shaft 110 turns, it moves movable barrier 122 utilizing gear box 111, which allows for small rotations of operating shaft 110 to equate to large movements of movable barrier 122 using different size gears within gear box 111. Consequently, cam 112 and 114's movement along operating shaft 110 will also equate to large shifts in the travel limits of movable barrier 122. As a result, fine-tune adjustment of the travel limits of movable barrier 122 is difficult to achieve using only cam 112 and cam 114; thus leaving an undesirable gap.

FIG. 1, in addition to the above mentioned elements, shows user input 101, potentiometer 102, quantized signal 103, analog to digital converter 104, and controller 106, incorporated into movable barrier operator 100 to help adjust the undesirable closing gap.

Adjustment of the undesirable closing gap begins when user input 101 is received from a user, typically a technician doing installation and set up of movable barrier 122. Potentiometer 102 subsequently converts user input 101 into a quantized signal 103. Quantized signal 103 is then converted from an analog format into a digital input signal 105 using analog to digital converter 104. Controller 106 receives input signal 105, and generates output signal 107 based on a factoring parameter 109. Output signal 107 is then sent to motor 108 to extend the operation of motor 108 to adjust the undesirable closing gap.

Although in the current embodiment, user input 101 is used to adjust an undesirable closing gap, between physical location of movable barrier 122 and a completely closed position; user input 101 can also be used to adjust an undesirable opening gap, between the physical location of movable barrier 122 and a completely opened position, without departing from the scope of the present invention.

A technician dials in a user input 101 when he observes an undesirable closing gap between the physical location of movable barrier 122 and the fully closed position. User input 101 may be a variable resistance from a potentiometer; however, user input 101 may also be a variable current from a resistor variable charging time from a capacitor, or even a frequency from a frequency generator without departing from the scope of the present invention.

User input 101 is sent to electrical component 102 after it is received from an operator. Electrical component 102 converts user signal 101 into a quantized signal 103. Quantized signal 103 may be in the form of a voltage; however, quantized signal 103 may be in the form of a charging time, a frequency, or any other quantized signal capable of outputting in small increments without departing from the scope of the present invention.

Potentiometer 102 here serves the purpose of generating an quantized signal 103 to send to analog to digital converter 104.

Analog to digital converter 104 converts analog signals such as quantized signal 103 to digital input signals, such as signal 105. In an exemplary embodiment, analog to digital converter 104 uses a direct conversion method to convert quantized signal 103 to digital input signals 105. In another embodiment, analog to digital converter 104 uses a successive-approximation conversion method to convert quantized signal 103 to digital input signals 105.

In fact, analog to digital converter 104 may implement various other methods to convert quantized signal 103 to digital input signals 105, including delta encoded conversion, ramp-compare conversion, pipeline conversion, or sigma-delta conversion, without deviating from the scope of the present invention.

In one embodiment, movable barrier operator 100 does not include analog to digital converter 104 and instead utilizes a digital potentiometer instead of an analog potentiometer 102, circumventing the need to convert signals from analog to digital format and minimizing the equipment required to interact with controller 106.

Controller 106 combines input signal 105 with a factoring parameter 109 to produce an output signal 107. Typically controller 106 is a processor; however, controller 106 may also be a centralized processing unit, a microprocessor, or any other device capable of combining input signal 105 with a factoring parameter 109 to produce output signal 107 without deviating from the scope of the present invention Factoring parameter 109 comprises of coefficients used to determine output signal 107 which extends the operation of motor 108 to adjust an undesirable closing gap. Factoring parameter 109 may be a first order linear function, a second order polynomial function, an nth order polynomial function, an exponential function, a trigonometric function, or any function that is used to derive an output signal 107 from an input signal 105, without departing from the scope of the present invention.

Controller 106 sends output signal 107 to motor 108 to continue the operation of motor 108 in order to adjust the undesirable closing gap. Typically, output signal 107 is a time period to continue operation of motor 108.

Figure 2:
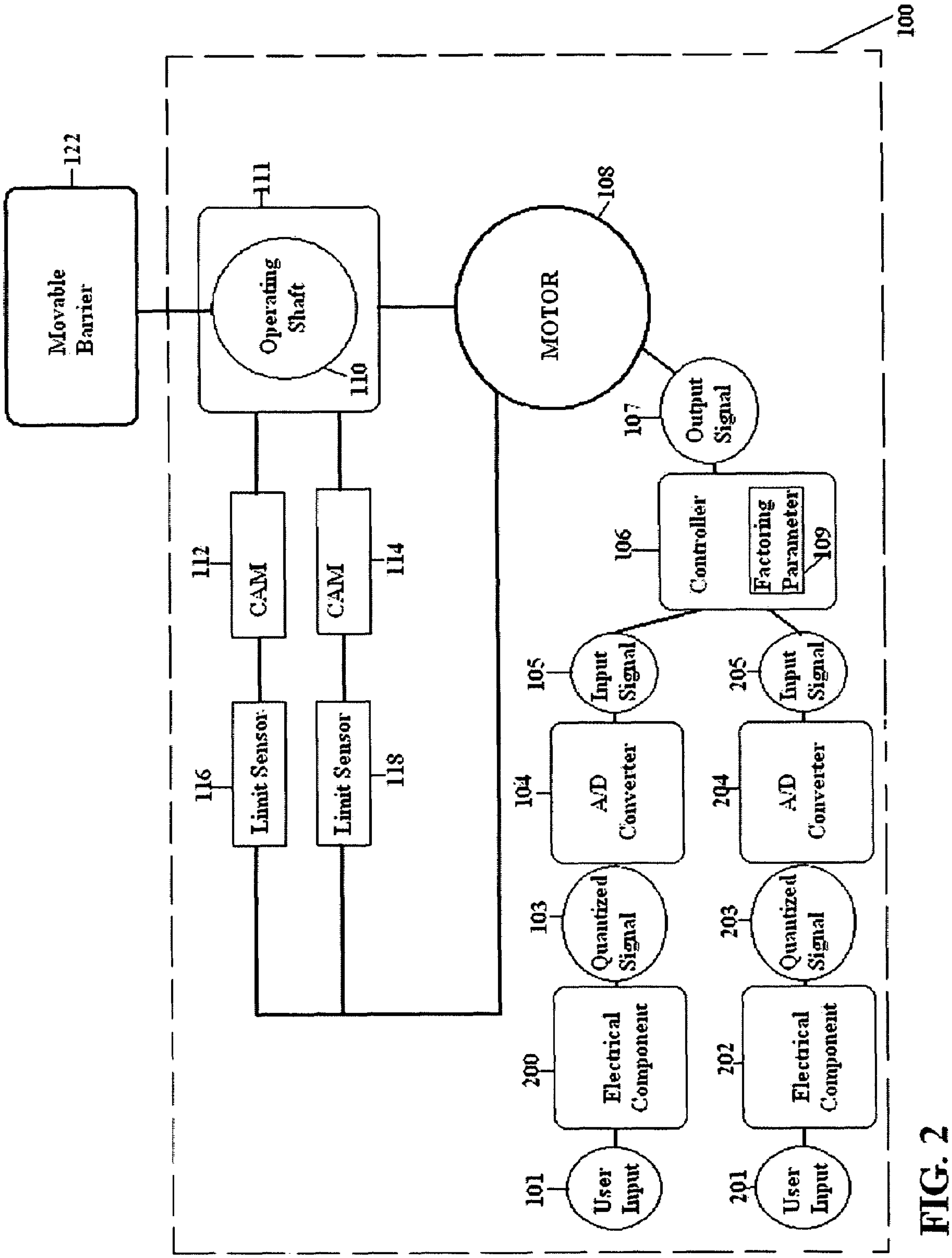
FIG. 2 illustrates a block diagram of the movable barrier operator in accordance with another embodiment of the present invention.

FIG. 2 illustrates another embodiment of the current invention containing an additional electrical component capable of adjusting an undesirable opening gap.

The embodiment referenced by FIG. 2 contains additional electrical component 202, and additional analog to digital converter 204. Although similar to the embodiment referenced by FIG. 1, the embodiment in FIG. 2 is also capable of controlling motor 108 to adjust an undesirable opening gap. Undesirable opening gap is a gap that is created when movable barrier 122 fails to reach its completely opened position.

FIG. 2 shows movable barrier operator 100 capable of eliminating both an undesirable closing gap and an undesirable opening gap. Electrical component 202 and analog to digital converter 204 are added to movable barrier operator 100 to receive an additional user input 201. Electrical component 202 converts user input 201 to quantized signal 203. Analog to digital converter converts quantized signal 203 to digital input signal 205, and subsequently sends input signal 205 to controller 106. Controller 106, upon receipt of input signal 205 generates output signal 107 to motor 108 to continue the operation of motor 108 to adjust an undesirable opening gap.

Electrical component 200 is the same component as potentiometer 102 depicted in FIG. 1. In the embodiment depicted in FIG. 1, electrical component 200 is defined as potentiometer 102 because of the reliability of a potentiometer at an economically practical price. However, electrical component 200 may also be a digital potentiometer, an encoder, a digital analog converter, a variable capacitor, a frequency generator, or any electrical component capable of a generating quantized signal 103 without deviating from the scope of the present invention.

In an exemplary embodiment, electrical component 200 is used to adjust an undesirable closing gap and electrical component 202 is used to adjust an undesirable opening gap. However, the functionality of the respective electrical components may be switched; electrical component 200 may be used to adjust) an undesirable opening gap and electrical component 202 may be used to adjust an undesirable closing gap, without departing from the scope of the present invention.

Figure 3:
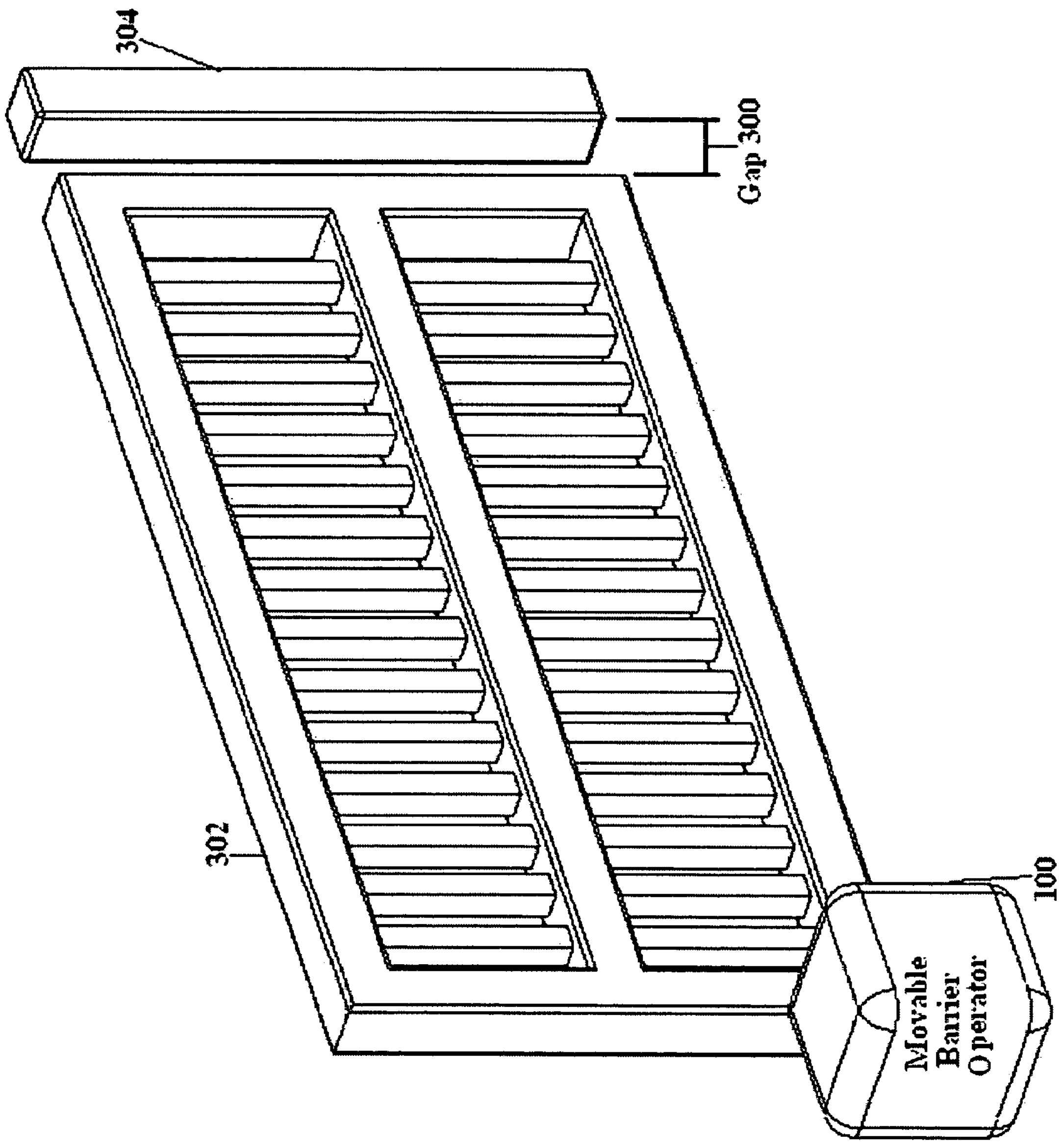
FIG. 3 illustrates a movable barrier controlled by a movable barrier operator indicating the existence of an undesirable gap.

FIG. 3 illustrates a gate with undesirable closing gap 300.

As shown in FIG. 3, movable barrier 302 is the same component as movable barrier 122 as depicted in FIG. 1. In the current embodiment, movable barrier 302 is demonstrated here as a sliding gate, and it has come to a stop, falling short of a completely closed position, thus creating undesirable gap 300 between movable barrier 302 and stopper 304.

Closing gap 300 exists because cam 112 and cam 114 can only be used for rough adjustment of the operating limits of movable barrier 122. As shown in FIG.1 Cam 112 and cam 114 locations on operating shaft 110 set the final position of movable barrier 112 when cam 112 or cam 114 come into contact with limit sensor 116 or limit sensor 118. Limit sensor 116 or limit sensor 118 triggers limit switch 120 upon such contact, and limit switch 120 sends a signal to motor 108 to stop movement of operating shaft 110. Although the location of cam 112 and cam 114 can be moved along operating shaft 110 to adjust the final position of movable barrier 122, such an adjustment is inaccurate. Cam adjustments are inaccurate because actual movements of movable barrier 122 in relation to cam position are significantly greater due to gear size differences in gear box 111, thus minor shifts of cam location equates to significant shifts in the position of movable barrier 122.

Figure 4:
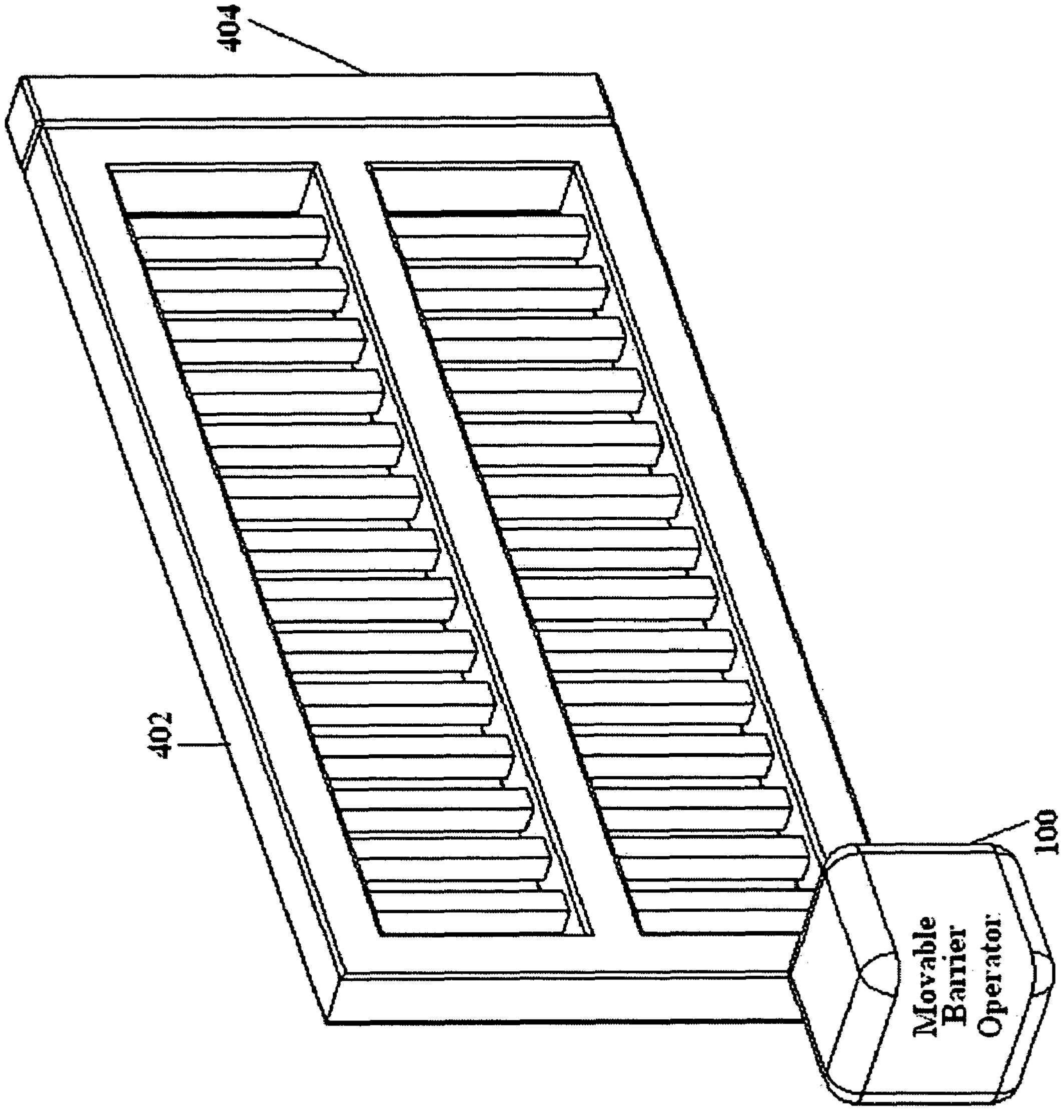
FIG. 4 illustrates a movable barrier controlled by a movable barrier operator eliminating the undesirable gap.

FIG. 4 illustrates a movable barrier 402 as a sliding gate, without an undesirable closing gap.

As shown in FIG. 4, movable barrier 402 is the same component as movable barrier 122 as depicted in FIG. 1 and movable barrier 302 as depicted in FIG. 3. In the current embodiment, movable barrier 402 is also demonstrated here as a sliding gate, however, movable barrier 402 could be swinging type gate, a sectional garage door, a flat unitary piece garage door, or any apparatus capable of creating an enclosure without departing from the scope of the present invention.

As shown in FIG. 4, undesirable gap 300 (not shown) from FIG. 3 is eliminated by incorporating an input signal 101 from potentiometer 102 to continue operation of motor 108 driving movable barrier 402 after limit switch 120 has been triggered. Continued operation of motor 108 will allow movable barrier 402 to achieve a completely closed position in contact with stopper 404.

Figure 5:
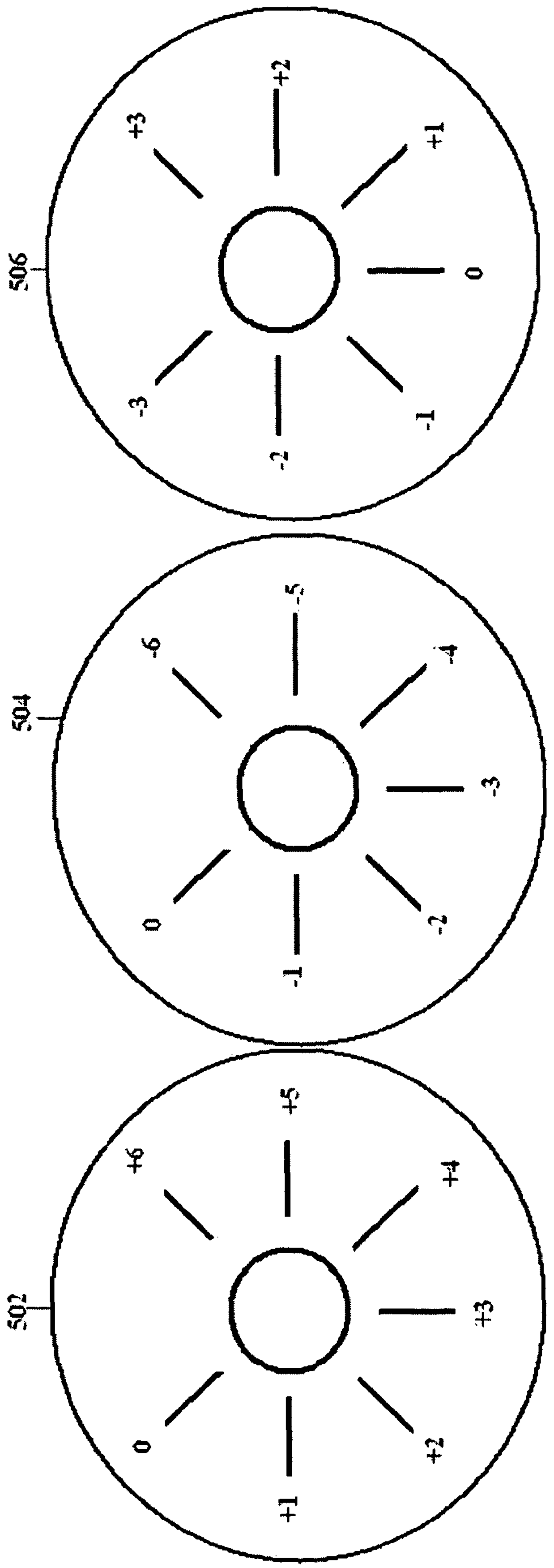
FIG. 5 illustrates different embodiments of a user interface allowing various control options.

FIG. 5 illustrates different embodiments of a potentiometer 102 in FIG. 1 allowing various control options.

Control knobs 502, 504, and 506 are different exemplary embodiments of potentiometer 102 each providing different control options for a user. Typically, potentiometer 102 comprises of control knobs; however potentiometer 102 in accordance with the present invention may comprise of switches, control keys, a computer key board, a graphical user interface, or any other type of interface that allows a user to provide movable barrier operator 100 with user input 101 or user input 201.

Control knob 502 may be connected to electrical component 102 in order to allow a user to fine-tune the operation of movable barrier operator 100 to adjust undesirable gap 300.

In an exemplary embodiment, movable barrier 122's response to user input 101 will not take effect until the next operation cycle, wherein motor 108 will continue to operate for the specified amount of time after limit switch 120 has been triggered.

In another embodiment, movable barrier 122 response to user input 101 will take effect instantaneously, wherein motor 108 will operate to jog movable barrier 122 in a desired direction as control knob 502 is being adjusted.

Control knob 502 shows one embodiment of a user interface of the present invention. Control knob 502 can continue the operation of motor 108 to adjust undesirable gap 300 of zero to six inches in accordance with the scope of the present invention.

Control knob 504 shows another embodiment of a user interface of the present invention. Control knob 504 extends the operation of motor 108 backwards to adjust an undesirable overlap of zero to six inches without departing from the scope of the present invention.

Control knob 506 shows yet another embodiment of a user interface of the present invention. Control knob 506 can either continue the operation of motor 108 in a forward direction or a backward direction from a range of negative three to positive three inches without departing from the scope of the present invention.

A movable barrier operator that allows travel limit adjustments of the position of the gate beyond its normal stoppage position has been described. More particularly, the disclosure provides for An apparatus in accordance with the present invention comprises of a movable barrier operator for controlling a travel limit of a movable barrier comprises of an electrical component sending an input signal to a controller, a controller to derive an output signal from the input signal, and a motor to receive the output signal and modify the travel limit of the movable barrier.

Additionally, an apparatus in accordance with the present invention comprises of a movable barrier operator for eliminating a gap of a movable barrier comprising, an electrical component configured to generate a quantized signal, converter for converting the quantized signal into a digital input signal, a controller for deriving an output signal as a function of the digital input signal, and a motor to receive the output signal.

Moreover, the present invention also discloses a method of eliminating a gap of a movable barrier in a closed position comprising of closing the movable barrier, adjusting an electrical component configured to generate a quantized signal, converting the quantized signal to a digital input signal, applying the digital input signal to a controller configured to drive a motor, deriving an output signal as a function of the digital input signal using said controller, sending the output signal to a motor, and commanding the motor to continue movement of the movable barrier to adjust the gap.

The foregoing description of the various embodiment of the invention has been presented for the purpose of illustration and description. It is not intended to be exhaustive or to limit the invention to the precise forms and method disclosed. It is not intended to be exhaustive or to limit the invention to the precise forms disclosed. Many modifications and variations are possible in light of the above teaching. It is intended that the scope of the invention not be limited by this detailed description, but by the claims and the equivalents to the claims appended hereto.

What is claimed is:

1. A movable barrier operator for opening and closing a movable barrier, comprising:

a shaft for moving said movable barrier;

a motor rotationally coupled to said shaft;

a sensor adapted to generate a first signal indicative of a first travel limit of the movable barrier by sensing the rotation of said shaft; and a user interface adapted to generate a second signal in response to a user input, wherein said second signal causes said first travel limit to change to a second travel limit of said movable barrier operator.

2. The movable barrier operator of claim 1, wherein said sensor comprises a first cam connected to said shaft, and a first limit sensor coupled to said first cam.

3. The movable barrier operator of claim 2, wherein said sensor comprises a second cam connected to said shaft, and a second limit sensor coupled to said second cam.

4. The movable barrier operator of claim 1, wherein said first travel limit of said movable barrier comprises a first closed limit, and said second travel limit of said movable barrier comprises a second closed limit of said movable barrier.

5. The movable barrier operator of claim 1, wherein said first travel limit of said movable barrier comprises a first open limit, and said second travel limit of said movable barrier comprises a second open limit of said movable barrier.

6. The movable barrier operator of claim 1, wherein said user interface further comprises:

an electrical component configured to generate a quantized signal from said user input; and a controller adapted to generate said second signal from said quantized signal for causing said first travel limit to change to a second travel limit of said movable barrier operator.

7. The movable barrier operator of claim 6, wherein said electrical component comprises a potentiometer.

8. The movable barrier operator of claim 6, wherein said electrical component comprises a variable capacitor.

9. A method of operating a movable barrier, comprising:

activating a motor to move said movable barrier;

generating a first signal indicative of when said movable barrier reaches a first travel limit; and generating a second signal that modifies the first travel limit to cause said motor to move said movable barrier to a second travel limit.

10. The method of claim 9, wherein generating said first signal indicative of said first travel limit of said movable barrier comprises sensing a rotation of a shaft coupled to said motor and said movable barrier.

11. The method of claim 10, wherein generating said first signal comprises coupling a first cam on said shaft to a first limit sensor.

12. The method of claim 11, further comprising:

connecting a second cam to said shaft, wherein said second cam is coupled to a second limit sensor.

13. The method of claim 12, wherein generating said second signal comprises:

generating a quantized signal; and generating said second signal from said quantized signal to modify said first signal to cause said motor to move said movable barrier to said second travel limit.

14. The method of claim 13, wherein said electrical component comprises a potentiometer.

15. The method of claim 13, wherein said electrical component comprises a variable capacitor.

16. The method of claim 13, wherein said first travel limit of said movable barrier comprises a first closed limit, and said second travel limit of said movable barrier comprises a second closed limit of said movable barrier.

17. The method of claim 13, wherein said first travel limit of said movable barrier comprises a first open limit, and said second travel limit of said movable barrier comprises a second open limit of said movable barrier.

18. An access system configured for tuning the opening and closing positions of a movable barrier, comprising:

a movable barrier;

a movable barrier operator coupled to said movable barrier, wherein said movable barrier operator further comprises:

a shaft for moving said movable barrier;

a motor rotationally coupled to said shaft;

a sensor adapted to generate a first signal indicative of a first travel limit of the movable barrier by sensing the rotation of said shaft; and a user interface adapted to generate a second signal in response to a user input, wherein said second signal causes said first travel limit to change to a second travel limit of said movable barrier operator.

19. The access system of claim 18, wherein said sensor comprises a first cam connected to said shaft, and a first limit sensor coupled to said first cam.

20. The access system of claim 19, wherein said sensor further comprises a second cam connected to said shaft, a second limit sensor coupled to said first cam.

21. The access system of claim 18, wherein said user interface further comprises:

an electrical component configured to generate a quantized signal from said user input; and a controller configured to generate said second signal based on said quantized signal for adjusting said first travel limit to said second travel limit of said movable barrier operator.

22. The access system of claim 21, wherein said electrical component comprises a potentiometer.

23. The access system of claim 21, wherein said electrical component is a variable capacitor.

24. The access system of claim 21, wherein said first travel limit of said movable barrier comprises a first closed limit, and said second travel limit of said movable barrier comprises a second closed limit of said movable barrier.

25. The access system of claim 21, wherein said first travel limit of said movable barrier comprises a first open limit, and said second travel limit of said movable barrier comprises a second open limit of said movable barrier.

26. A movable barrier operator for opening and closing a movable barrier, comprising:

a shaft for moving said movable barrier;

a motor rotationally coupled to said shaft;

a cam connected to said shaft, wherein said cam is coupled to a limit sensor, wherein said limit sensor is adapted to generate a first signal indicative of a first travel limit of the movable barrier by sensing the rotation of said shaft; and a user interface adapted to generate a second signal in response to a user input, wherein said second signal causes said first travel limit to change to a second travel limit of said movable barrier operator, said user interface further comprising:

an electrical component configured to generate a quantized signal from said user input, and a controller configured to generate said second signal for causing said first travel limit to change to said second travel limit of said movable barrier operator.

* * * * *